United States Patent
Shin et al.

(10) Patent No.: US 8,320,768 B2
(45) Date of Patent: Nov. 27, 2012

(54) COMMUNICATION LINK APPARATUS AND METHOD FOR MAINTAINING VISIBILITY IN VISIBLE LIGHT COMMUNICATION

(75) Inventors: Dong-Jae Shin, Seoul (KR);
Dae-Kwang Jung, Suwon-si (KR);
Jeong-Seok Choi, Yongin-si (KR);
Hong-Seok Shin, Suwon-si (KR);
Kyung-Woo Lee, Yongin-si (KR);
Sung-Bum Park, Suwon-si (KR);
Yoo-Jeong Hyun, Seongnam-si (KR);
Seong Hoon Hyun, legal representative, Gyeonggi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 749 days.

(21) Appl. No.: 12/217,550

(22) Filed: Jul. 7, 2008

(65) Prior Publication Data
US 2009/0010654 A1     Jan. 8, 2009

(30) Foreign Application Priority Data
Jul. 6, 2007 (KR) .................. 10-2007-0067970

(51) Int. Cl.
*H04B 10/00* (2006.01)
(52) U.S. Cl. .................................. 398/135
(58) Field of Classification Search .......... 398/118–131, 398/175, 55, 96, 103, 117
See application file for complete search history.

(56) References Cited

U.S. PATENT DOCUMENTS

| | | | |
|---|---|---|---|
| 6,504,635 B1 * | 1/2003 | Nakashima | 398/25 |
| 7,565,082 B2 * | 7/2009 | Yazaki et al. | 398/129 |
| 2003/0222587 A1 * | 12/2003 | Dowling et al. | 315/149 |
| 2006/0056855 A1 * | 3/2006 | Nakagawa et al. | 398/183 |
| 2007/0147843 A1 * | 6/2007 | Fujiwara | 398/118 |

* cited by examiner

*Primary Examiner* — Kenneth N Vanderpuye
*Assistant Examiner* — Abbas H Alagheband
(74) *Attorney, Agent, or Firm* — Cha & Reiter, LLC

(57) ABSTRACT

A system and method for continuing a communication link while maintaining visibility in visible light communication. A frame is transmitted by a sender for establishing a communication link before data transmission to a receiver by a sender. A receiver sends a response frame that reports on establishment of the communication link prior to data transmission by the sender. A data frame containing information is transmitted by the sender to the receiver. An acknowledgment frame is transmitted to the sender in response to the data frame. A disconnect frame is transmitted by the sender which is acknowledged by the receiver. A visible sequence is transmitted during a time period when the sender and the receiver do not transmit respective frames for communication to maintain visibility between two devices that may be communicating otherwise by, for example, infrared communication.

14 Claims, 7 Drawing Sheets

COMMUNICATION LINK APPARATUS AND METHOD FOR MAINTAINING VISIBILITY IN VISIBLE LIGHT COMMUNICATION

CLAIM OF PRIORITY

This application claims the benefit under 35 U.S.C. §119(a) from an application entitled "Communication Link Apparatus and Method for Maintaining Visibility in Visible Light Communication" field in the Korean Intellectual Property Office on Jul. 6, 2007 and assigned Serial No. 2007-67970, the contents of which are hereby incorporated by reference in its entirety.

BACKGROUND OF THE INVENTION

1. Field of the Invention

The present invention relates to a system and process used for visible light communication (VLC). More particularly, the present invention relates to a protocol for an interface of a wireless peripheral device that uses visible light as communication media.

2. Description of the Related Art

Recent advancements in the luminance efficiency of Light Emitting Diodes (LEDs) and a general price reduction for the costs of LEDs, has contributed to a wide spread increase in sales of LEDS for use in general lighting markets. In such general lighting markets, which include but are not limited to markets for the manufacture and sales of fluorescent lamps and incandescent lamps, as well as specific lighting markets, including markets of portable devices, displays, automobiles, traffic lights, billboards, etc., such markets have all had increased sales in the LED area.

In particular, white LEDs have now exceeded incandescent lamps in the luminance efficiency, and products using LEDS that are superior to fluorescent lamps have emerged. Recently, various factors (e.g. the exhaustion of RF band frequencies, potential crosstalk between several wireless communication technologies, an increasing demand for communication security, advent of an ultra-high speed ubiquitous communication environment based on 4G wireless technologies) have increased interest in radio over fiber technologies complementary to RF technologies. Therefore, research on visible light wireless communication employing visible light LEDs is now in progress by many enterprises and laboratories.

In the case of portable devices, such as, for example, a cellular phone and/or a PDA, and other small-sized digital appliances, including but not limited to as a digital camera and an mp3 (MPEG audio layer 3) player, considerable research has been already conducted for a peripheral interface performing inter-device communication using an Infrared Data Association (IrDA) module equipped therein, and related products have been developed and commercialized.

Unlike Radio Frequency (RF) communication, such as Bluetooth, Zigbee, etc., infrared wireless communication has several advantages in that it can achieve reliable security and lower power consumption without crosstalk between devices.

In view of the above-identified benefits associated with infrared wireless communication, there is an expectation that future local wireless communication systems will mainly employ a light-based scheme. Moreover, there has been a proposal to adopt a communication method based on visible light, rather than infrared light (i.e. IrDA modules), and a visible light-based scheme may be the main method of local communication in the future, especially considering the remarkable development in LED technology and better prices. One major difference between the visible light communication and other types of wireless RF communication lies in the fact that the user can recognize the data transmission/reception process and can visually check the communication security. In other words, the user can easily recognize not only the location of sending and receiving sides, but also the communication path.

FIG. 1A is a block diagram of the architecture of an infrared wireless interface in conventional infrared communication based on visible light.

The infrared communication protocol shown in FIG. 1A includes an upper layer, an Infrared Link Access Protocol (IrLAP) layer, an Encoder/Decoder (EnDec) layer, and a physical (TRx) layer. The IrLAP layer, also called a data link layer, performs particulars related to prescription of rules for accessing infrared media and procedures for communication schemes. The EnDec layer encodes or decodes original data to reduce error rates at the time of data transmission.

FIG. 1B is a view illustrating a frame exchange scheme adopted by the IrLAP layer in conventional infrared communications.

Referring to FIG. 1B, the frame architecture for data transmission includes at least one data frame required for data transmission from a sender to a receiver, at least one response frame needed by the receiver to inform the sender of a response regarding communication link establishment before the communication partner transmits data, and at least one acknowledge (ACK) frame for reporting a response regarding data transmission.

The data transfer path in transmission/reception processes as shown in FIG. 1B is as follows: the sender transmits a device discovery frame to the receiver, and then the receiver transmits a discovery response frame to the sender to respond to the transmitted frame and recognize the transmitting/receiving apparatus. Then, the sender sends a link negotiation frame to the receiver, and then the receiver sends a negotiation response frame to the sender to establish a link between the sender and the receiver. Then, the sender transmits a data frame containing actual data to the receiver via the established link, and the receiver transmits a data acknowledge frame to the sender to respond to the received data frame and perform data communication.

However, the conventional infrared communication scheme shown in FIG. 1B (half-duplex communication) has a problem in that, since no infrared ray is transmitted before a communication link is established, there is a long standby time after a short transmission until the reception process occurs. Such a phenomenon worsens when a link is established and when a temporarily disconnected link is restored.

Conventional infrared communication protocols have a problem in that, since no infrared ray is transmitted before a communication link is established, there is a long standby time after a short transmission until the reception process occurs. This means that, if a conventional infrared communication protocol is used for visible light communication, the user cannot align communication links through visual recognition of visible light.

Therefore, if visible light is used without modifying the infrared communication protocol, visibility is lost at the time of link connection and link restoration. That is, if the above-mentioned conventional infrared communication protocol is applied to visible light communication, the user cannot align communication links through visual recognition of visible light.

SUMMARY OF THE INVENTION

Accordingly, the present invention provides a protocol for an interface of a wireless peripheral device that uses visible light as communication media as an alternative to infrared communication. More specifically, the present invention proposes a protocol that maintains visibility throughout the entire communication process in conventional infrared communication by using the characteristics of visible light so that the user can visually recognize the location and scope of visible light.

In accordance with one exemplary aspect of the present invention, there is provided a method for continuing a communication link while maintaining visibility in visible light communication, the method including exemplary steps of transmitting a frame for communication link establishment before data transmission to a receiver by a sender; receiving a response frame for reporting a response regarding communication link establishment before data transmission from the receiver by the sender; transmitting a data frame containing information to the receiver by the sender; receiving an acknowledge frame for a response to the data frame from the receiver by the sender; transmitting a disconnect frame to the receiver by the sender; receiving a disconnect acknowledge frame for a response to the disconnect frame from the receiver by the sender; and transmitting a visible sequence in a time period when the sender and the receiver do not transmit respective frames for communication.

In accordance with another exemplary aspect of the present invention, there is provided a communication link apparatus for maintaining visibility in visible light communication, the communication link apparatus including a sender for transmitting a frame for communication link establishment before data transmission, a data frame containing information, and a disconnect frame for communication link disconnection to a receiver; and a receiver for transmitting a response frame regarding communication link establishment and an acknowledge frame regarding data reception to the sender, wherein a visible sequence is transmitted to provide the communication link with visibility in a time period when the sender and the receiver transmit no frames for communication.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings. In the following description, various specific definitions found in the following description are provided only to assist with a general understanding of the present invention, and it is apparent to those skilled in the art that the present invention can be implemented without such definitions.

Figure 2:
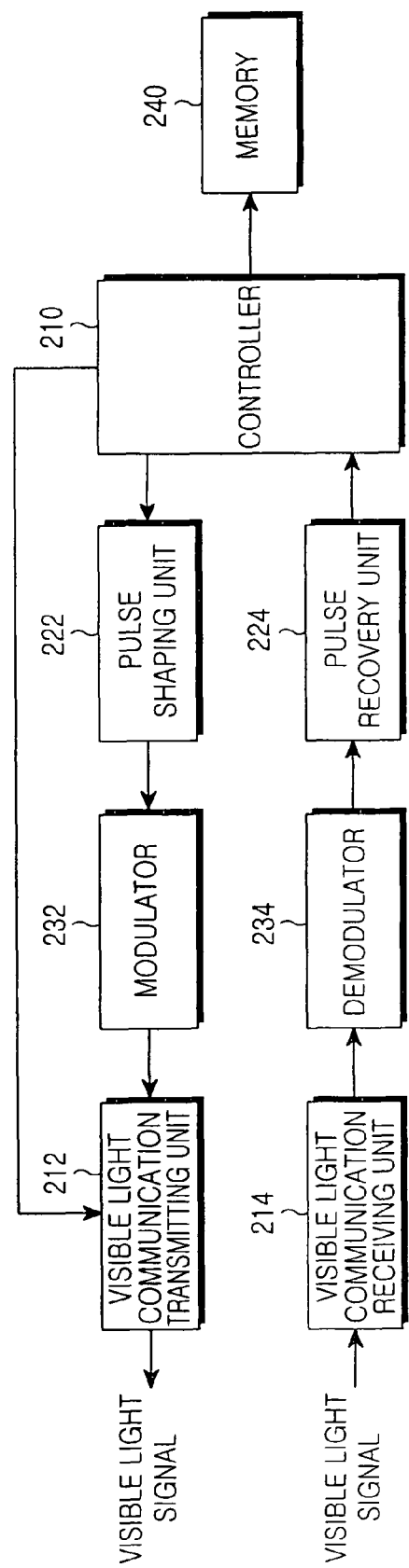
FIG. 2 is a block diagram of the internal construction of a transmitting/receiving apparatus in infrared communication employing visible light according to the present invention.

FIG. 2 is an exemplary block diagram of the internal construction of a transmitting/receiving apparatus in infrared communication employing visible light according one possible configuration according to the present invention. A person of ordinary skill in the art understands and appreciate that the while the units are shown as separate boxes for separate functions, one or more functions may be combined. The transmitting/receiving apparatus includes a controller 210, a visible light communication transmitting unit 212, a visible light communication receiving unit 214, a pulse shaping unit 222, a pulse recovery unit 224, a modulator 232, and a demodulator 234.

The controller 210 controls the overall operation of the transmitting/receiving apparatus. Particularly, under the control of the controller 210, a visible sequence frame, which contains no information but can provide visibility, can be output even in a time period of waiting for data to be received, so that visibility is maintained throughout the entire visible light communication process, as described later. Also, data received for visible light communication is stored in a memory 240.

The pulse shaping unit 222 creates a pulse signal corresponding to data for transmission and outputs the created pulse signal to the modulator 232. The modulator 232 modulates the inputted pulse signal into a signal suitable for visible light communication and outputs the modulated signal to the visible light communication transmitting unit 212. In this case, the visible light communication transmitting unit 212 outputs a corresponding visible light signal according to a control signal from the controller 210. The visible light communication transmitting unit 212 may include, for example, a Laser Diode (LD), a Light Emitting Diode (LED), or an array of an LD and an LED, as a light source, just to name some possible light sources.

Still referring to FIG. 2, when a visible light signal transmitted from another visible light communication apparatus is input to the visible light communication receiving unit 214, the visible light communication receiving unit 214 converts the inputted visible light signal into an electrical signal and outputs the electric signal. In this case, the visible light communication receiving unit 214 may include a photodiode which converts light, input from the outside, into an electrical signal.

Meanwhile, the demodulator 234 demodulates the inputted electrical signal into data conforming to a visible light communication scheme and then outputs the data to the pulse recovery unit 224. The pulse recovery unit 224 restores an inputted electric signal to a pulse signal and outputs the pulse signal to the controller 210.

Figure 3A:
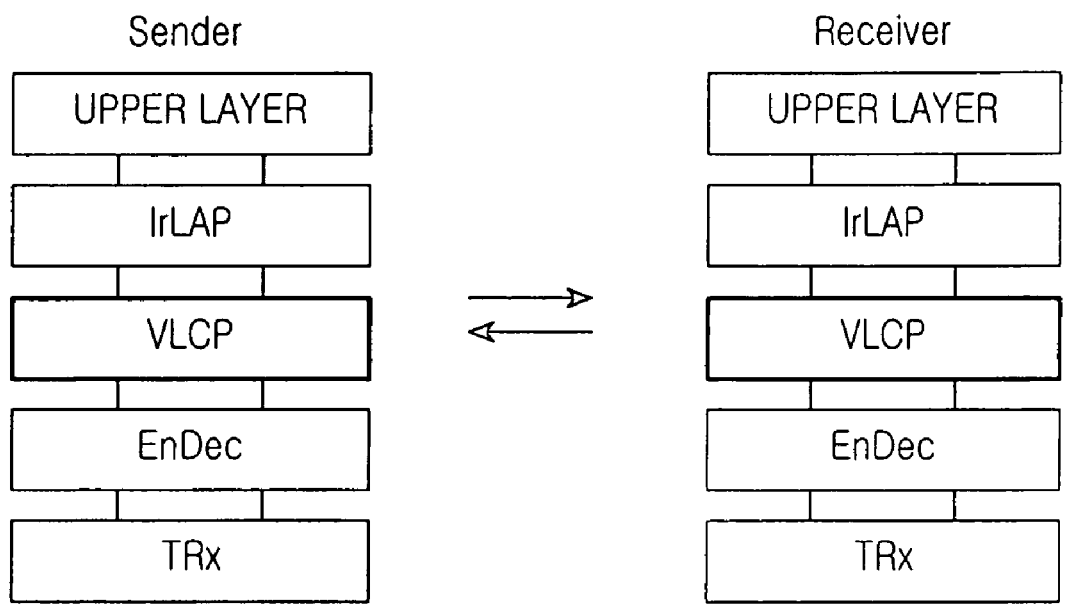
FIG. 3A is a view of the architecture of an infrared wireless interface in visible light communication having visibility according to one exemplary embodiment of the present invention.

With reference to FIG. 3A, the architecture of a protocol having a Visible Light Communication Protocol (VLCP) layer added to an Infrared Link Access Protocol (IrLAP) layer so that visibility is maintained in a conventional infrared communication protocol, based on the description with reference to FIG. 2, will now be described.

Figure 1A:
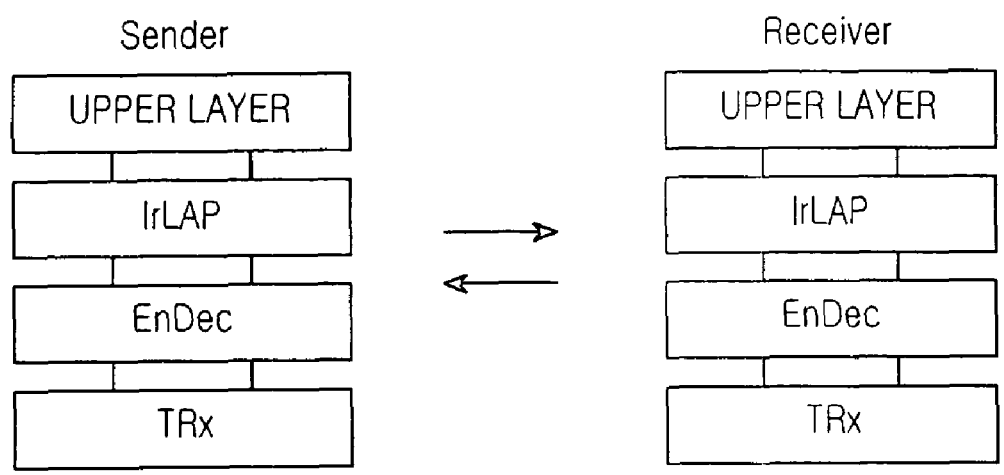
FIG. 1A is a block diagram of the architecture of an infrared wireless interface in conventional infrared communication based on visible light.

FIG. 3A is a view of the architecture of an infrared wireless interface in visible light communication having visibility according to one embodiment of the present invention. The architecture of the infrared wireless interface according to the present invention includes an upper layer, an IrLAP layer, an EnDec layer, and a physical layer (TRx) as shown in FIG. 1A, as well as a VLCP layer added to the IrLAP layer to maintain visibility.

Figure 3B:
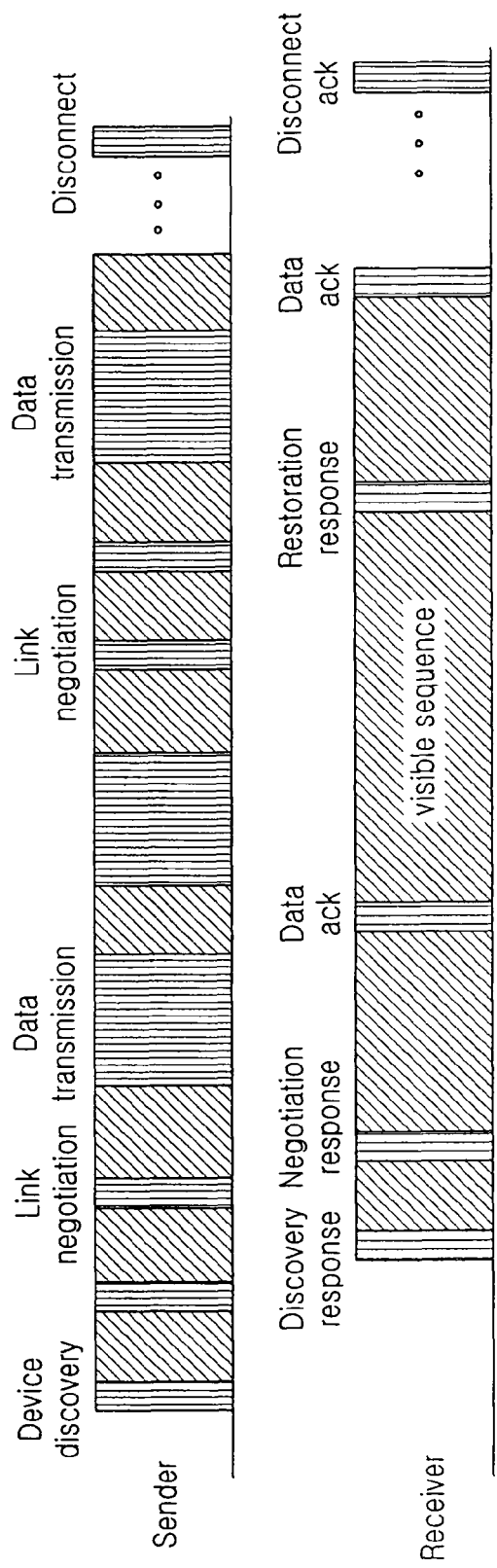
FIG. 3B is a view illustrating a frame exchange scheme adopted by the IrLAP layer in visible light communication having visibility according to one exemplary embodiment of the present invention.

FIG. 3B is an exemplary view illustrating a frame exchange scheme adopted by the IrLAP layer in visible light communication having visibility according to one exemplary embodiment of the present invention.

Figure 1B:
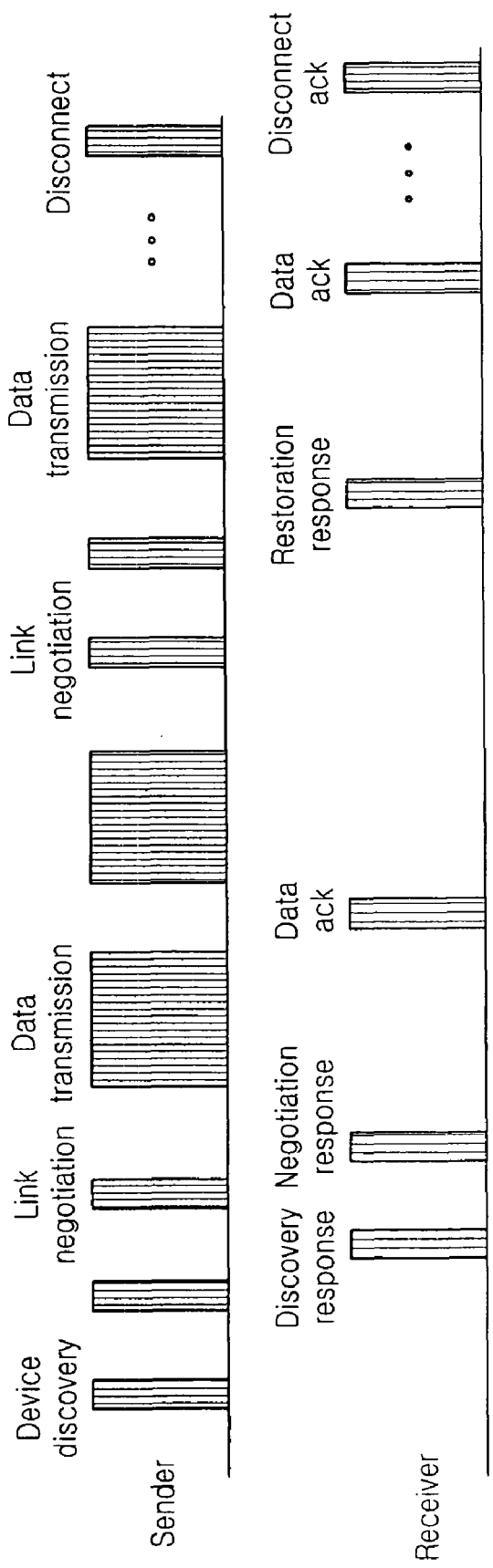
FIG. 1B is a view illustrating a frame exchange scheme adopted by the IrLAP layer in conventional infrared communication based on visible light.

Referring to FIG. 3B, the overall frame architecture during data transmission includes at least one data frame required for data transmission from the sender to the receiver, at least one response frame needed by the receiver to inform the sender of a response regarding communication link establishment before the communication partner transmits data, and at least one acknowledge (ACK) frame for reporting a response regarding data transmission, all of which have been described with reference to FIG. 1B, as well as at least one visible sequence frame that contains no information but can provide visibility.

The data transfer path in transmission/reception processes, as has been described with reference to FIG. 1B, may be operated according to the following example: the sender transmits a device discovery frame to the receiver, and then the receiver transmits a discovery response frame to the sender to respond to the transmitted frame and recognize the transmitting/receiving apparatus. Then, the sender sends a link negotiation frame to the receiver, and then the receiver sends a negotiation response frame to the sender to establish a link between the sender and the receiver. Next, the sender transmits a data frame containing actual data to the receiver via the established link, and the receiver transmits a data acknowledge frame to the sender to respond to the received data frame and perform data communication.

With regard to the above-mentioned problem of visibility being lost at the time of the link connection and the link restoration, the present invention overcomes this obstacle by the VLCP layer outputting a visible sequence frame between respective frames of the sender and receiver, as described above, so that visibility is maintained throughout the entire communication process. The role of the VLCP layer will be described in more detail with reference to FIG. 4.

Figure 4:
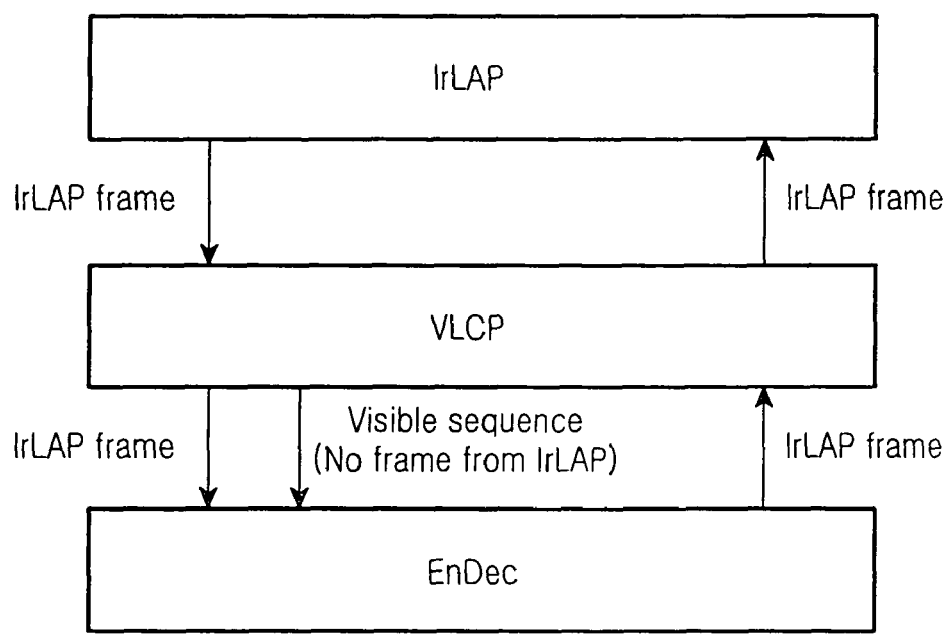
FIG. 4 is a view illustrating the function of a visible light communication protocol (VLCP) according to one exemplary embodiment of the present invention.

FIG. 4 is a view illustrating the function of a visible light communication protocol (VLCP) according to one exemplary embodiment of the present invention.

Referring to FIG. 4, the VLCP layer is positioned between the IrLAP layer and the EnDec layer. When a frame for transmission descends from the IrLAP layer to the VLCP layer, the frame is transferred to the EnDec layer to output visible light carrying a communication signal. When no frame for transmission descends from the IrLAP layer, a visible sequence is transferred to the EnDec layer to output visible light not carrying a communication signal, so that visibility is maintained throughout the entire process. In contrast, when a frame ascends from the EnDec layer, the frame is transferred to the IrLAP layer. When no frame ascends from the EnDec layer, nothing is transferred to the IrLAP layer. The VLCP layer is activated in a device discovery process of the IrLAP layer, and the VLCP layer is deactivated in a disconnect process. That is, the visibility due to the VLCP Layer exists only between the device discovery process and the disconnect process, which minimizes power consumption.

In order to provide visibility throughout the entire communication process in the infrared communication protocol, which generally employs half-duplex communication, the physical layer preferably supports full-duplex communication. In addition, the receiver preferably distinguishes between the visible sequence and the IrLAP frame, that is, the frame having information.

Figure 5:
FIG. 5 is a diagrammatic view illustrating a format used in a method for distinguishing between a visible sequence and an IrLAP frame according to one exemplary embodiment of the present invention.

FIG. 5 is a diagrammatic view illustrating a format used in a method for distinguishing between a visible sequence and an IrLAP frame according to another exemplary embodiment of the present invention.

Referring now to FIG. 5, in order to distinguish between the visible sequence and the IrLAP frame having information, BOF (Beginning Of Frame), XBOF (Extended BOF), EOF (End Of Frame), and FCS (Frame Check Sum) are used. The XBOF and the BOF are sequentially outputted before the IrLAP frame is outputted. After the IrLAP frame is outputted, the FCS is outputted to check information. Then, the EOF is outputted, and the visible sequence frame is outputted.

All frames according to the present invention are preferably outputted as binary sequences including 0s and 1s. Among the frames of binary sequences, particularly, the visible sequence frame used in FIG. 5 is distinguishable from the BOF, EOF, or IrLAP frame. Typically, the 8B10B encoding scheme is adopted to obtain a bit stream, which is differentiated from other bit streams.

As described above, the present invention is advantageous in that visibility is maintained throughout the entire communication process in a protocol based on, for example, infrared communication by employing the characteristic of visible light, so that the user can visually recognize the location and scope of visible light and align communication links.

While the invention has been shown and described with reference to certain exemplary embodiments thereof, it will be understood by those skilled in the art that various changes in form and details may be made therein without departing from the spirit and scope of the invention as defined by the appended claims. For example, while separate transmitting and receiving units are shown and described in the examples, a single transceiver may perform both functions. Moreover, while one exemplary embodiment discloses visible light transmission for all of the steps, and another discloses the use of a visible light sequence between the steps while an infrared communication protocol is used, the invention also includes transmission two or more of the steps by infrared communication and a remainder by VLC.

What is claimed is:
1. A method comprising:
  (a) transmitting, by a sender, a frame for establishing a communication link with a receiver prior to transmitting data;
  (b) receiving, by the sender, a response frame for reporting a response regarding establishing the communication link with the receiver prior to transmitting data;
  (c) transmitting, to the receiver, a data frame containing information from the sender;
  (d) receiving, by the sender, an acknowledge frame from the receiver in response to the data frame transmitted by the sender;
  (e) transmitting, by the sender, a disconnect frame to the receiver;
  (f) receiving by the sender, a disconnect acknowledge frame from the receiver in response to the disconnect frame transmitted by the sender; and

(g) transmitting a visible light sequence in a time period when the sender and the receiver have no data to transmit during respective frames when data is typically transmitted in an infrared communication protocol, the visible light sequence providing an indication that infrared communication is ongoing.

2. The method according to claim 1, wherein at least one of steps (a), (b), (c), (d), (e) and (f) transmit using an infrared communication protocol.

3. The method according to claim 1, wherein more than two of steps (a), (b), (c), (d), (e) and (f) transmit using an infrared communication protocol.

4. A method comprising:
(a) transmitting, by a sender, a frame for establishing a communication link with a receiver prior to transmitting data;
(b) receiving, by the sender, a response frame for reporting a response regarding establishing the communication link with the receiver prior to transmitting data;
(c) transmitting, to the receiver, a data frame containing information from the sender;
(d) receiving, by the sender, an acknowledge frame from the receiver in response to the data frame transmitted by the sender;
(e) transmitting, by the sender, a disconnect frame to the receiver;
(f) receiving by the sender, a disconnect acknowledge frame from the receiver in response to the disconnect frame transmitted by the sender; and
(g) transmitting a visible light sequence in a time period when the sender and the receiver have no data to transmit during respective frames when data is typically transmitted in an infrared communication protocol;
wherein step (g) comprises the sub-steps of:
(i) transferring a particular frame containing information to a Encoder/Decoder (EnDec) layer, the particular frame descending from an Infrared Link Access Protocol (IrLAP) layer;
(ii) transferring the visible light sequence which does not contain information to the EnDec layer when no frame containing information descends from the IrLAP layer; and
(iii) transferring a frame containing information to the IrLAP layer, the frame ascending from the EnDec layer.

5. A method comprising:
(a) transmitting, by a sender, a frame for establishing a communication link with a receiver prior to transmitting data;
(b) receiving, by the sender, a response frame for reporting a response regarding establishing the communication link with the receiver prior to transmitting data;
(c) transmitting, to the receiver, a data frame containing information from the sender;
(d) receiving, by the sender, an acknowledge frame from the receiver in response to the data frame transmitted by the sender;
(e) transmitting, by the sender, a disconnect frame to the receiver;
(f) receiving by the sender, a disconnect acknowledge frame from the receiver in response to the disconnect frame transmitted by the sender; and
(g) transmitting a visible light sequence in a time period when the sender and the receiver have no data to transmit during respective frames when data is typically transmitted in an infrared communication protocol;
wherein the visible sequence differentiates frames by identifying distinguishing bit streams from a Beginning of Frame (BOF) and an End of Frame (EOF) for distinguishing between frames containing information from frames that do not contain information based on a difference in bit streams.

6. The method as claimed in claim 5, wherein the BOF and the EOF used repeatedly to distinguish frames containing information from frames that do not contain information.

7. A communication link apparatus comprising:
a transceiver for transmitting: (a) a frame for establishing a communication link prior to data transmission, (b) a data frame containing information, and (c) a disconnect frame for disconnecting the communication link;
wherein said transceiver receives a response frame regarding establishment of the communication link and an acknowledge frame regarding data being received by a sender; and
a visible light sequence means for transmitting a visible light sequence during a time period when the transceiver has no data to transmit during respective frames when data is typically transmitted in an infrared communication protocol, the visible light sequence providing an indication that infrared communication is ongoing.

8. A communication link apparatus comprising:
a transceiver for transmitting: (a) a frame for establishing a communication link prior to data transmission, (b) a data frame containing information, and (c) a disconnect frame for disconnecting the communication link; wherein the transceiver receives a response frame regarding establishment of the communication link and an acknowledge frame regarding data being received by a sender; and
a visible light sequence means for transmitting a visible light sequence during a time period when the transceiver has no data to transmit during respective frames when data is typically transmitted in an infrared communication protocol;
wherein the communication link is provided with visibility by a visible light communication protocol layer added between an Infrared Link Access Protocol (IrLAP) layer and an Encoder/Decoder (EnDec) layer of an infrared communication protocol.

9. The communication link apparatus as claimed in claim 8, wherein the visible light communication protocol (VLCP) layer is activated during a device discovery function of the IrLAP layer, and the (VLCP) layer is deactivated during a disconnect function.

10. The communication link apparatus according to claim 7, wherein the transceiver is arranged in a sender device for establishing the communication link with a receiver device.

11. The communication link apparatus according to claim 7, wherein the transceiver includes means for communicating with an infrared communication protocol for transmitting: (i) to establish the communication link, (ii) transmit and receive data frames, (iii) receive acknowledgement frames and (iv) transmit disconnect frames.

12. The communication link apparatus according to claim 11, wherein the visible sequence means transmits a visible light sequence between items (ii) (iii) and (iv).

13. The communication link apparatus according to claim 10, wherein the visible sequence means transmits a visible light sequence in any time period where data is not transmitted between the sender device and a receiving device.

14. The communication link apparatus according to claim 7, further comprising a controller for differentiating frames by identifying distinguishing bit streams from a Beginning of Frame (BOF) and an End of Frame (EOF) to distinguish between frames containing information from frames that do not contain information, based on a difference in bit streams.

* * * * *